(12) United States Patent
Metral

(10) Patent No.: US 7,894,209 B2
(45) Date of Patent: Feb. 22, 2011

(54) TELECOMMUNICATIONS TERMINAL MODULE WITH HINGED GROUNDING ELEMENT

(75) Inventor: Guy Metral, Cluses (FR)

(73) Assignee: 3M Innovative Properties Company, St. Paul, MN (US)

( * ) Notice: Subject to any disclaimer, the term of this patent is extended or adjusted under 35 U.S.C. 154(b) by 770 days.

(21) Appl. No.: 11/910,784

(22) PCT Filed: Aug. 2, 2006

(86) PCT No.: PCT/US2006/030068

§ 371 (c)(1),
(2), (4) Date: Oct. 5, 2007

(87) PCT Pub. No.: WO2007/019166

PCT Pub. Date: Feb. 15, 2007

(65) Prior Publication Data

US 2008/0192414 A1 Aug. 14, 2008

(30) Foreign Application Priority Data

Aug. 5, 2005 (EP) .................................. 05017054

(51) Int. Cl.
*H05K 7/14* (2006.01)
*H05K 7/18* (2006.01)

(52) U.S. Cl. ........................ 361/799; 361/816; 361/818

(58) Field of Classification Search ................. 361/799, 361/816, 818, 800, 79, 753, 715, 755; 174/350, 174/51, 35 R
See application file for complete search history.

(56) References Cited

U.S. PATENT DOCUMENTS

| 4,846,727 | A | 7/1989 | Glover et al. |
| 5,800,187 | A | 9/1998 | Vermon et al. |
| 6,231,369 | B1 | 5/2001 | Miyajima et al. |
| 6,654,255 | B2 * | 11/2003 | Kruse et al. ................. 361/799 |
| 7,442,094 | B2 * | 10/2008 | Denter et al. ............... 439/719 |
| 2005/0063531 | A1 | 3/2005 | Arias |
| 2005/0221665 | A1 * | 10/2005 | Otto et al. ................... 439/532 |

FOREIGN PATENT DOCUMENTS

| EP | 0 304 393 A2 | 2/1989 |
| EP | 0 909 102 A2 | 4/1999 |
| EP | 1 578 145 A | 9/2005 |
| JP | 08-219926 | 8/1996 |
| WO | WO 03/079644 A2 | 9/2003 |

* cited by examiner

*Primary Examiner*—Hung S Bui
(74) *Attorney, Agent, or Firm*—Janet A. Kling

(57) ABSTRACT

The invention relates to an assembly of at least one carrier (12), at least one telecommunications module (10) mounted on the carrier (12) and at least two grounding elements (14, 16), at least one grounding element (14) being fitted to the telecommunications module, and at least one grounding element (16) being fitted to the carrier (12), wherein the grounding elements (14, 16) are in direct contact with each other and can be pivoted with regard to each other while keeping the contact.

16 Claims, 2 Drawing Sheets

TELECOMMUNICATIONS TERMINAL MODULE WITH HINGED GROUNDING ELEMENT

CROSS REFERENCE TO RELATED APPLICATIONS

This application is a national stage filing under 35 U.S.C. 371 of PCT/US2006/030068, filed 2 Aug. 2006, which claims priority to EP Application No. 05017054.7, filed 5 Aug. 2005, the disclosures of which is incorporated by reference in their entirety herein.

TECHNICAL FIELD

The invention relates to an assembly of at least one carrier, at least one telecommunications module and at least two grounding elements, a grounding element, a telecommunications module and a carrier for use in the assembly, a kit of parts and a use of at least two grounding elements.

BACKGROUND

In the field of telecommunications, numerous customers are connected with the switch of a telecommunications company via telecommunications lines. The customers can also be called subscribers. The switch is also called an exchange or PBX (central office exchange operated by the telecommunications company). Between the subscriber and the switch, sections of the telecommunications lines are connected with telecommunications modules. The telecommunications modules establish an electrical connection between a wire, which is attached to the telecommunications module at a first side, and another wire, which is attached to the telecommunications module at a second side. The wires of one side can also be called incoming wires and the wires of the other side can be called outgoing wires. Plural telecommunications modules can be put together at a distribution point, such as a main distribution frame, an intermediate distribution frame, an outside cabinet or a distribution point located, for example, in an office building or on a particular floor of an office building. To allow flexible wiring, some telecommunications lines are connected with first telecommunications modules in a manner to constitute a permanent connection. Flexibility is realized by so-called jumpers or cross connects, which flexibly connect contacts of the first telecommunications module with contacts of a second telecommunications module. These jumpers can be changed when a person moves within an office building to provide a different telephone (i.e. a different telephone line) with a certain telephone number, which the relocated person intends to keep. In the telecommunications module, disconnection points can be located in the electrical connection between the two sides. At such disconnection points, disconnection plugs can be inserted, in order to disconnect the line. Furthermore, protection plugs and magazines are known. These are connected to the module and protect any equipment connected to the wires from overcurrent and overvoltage. Finally, test plugs can be inserted at a disconnection point in order to test or monitor a line.

Recently, ADSL-technology has spread widely in the field of telecommunications. This technology allows at least two different signals to be transmitted on a single line. This is achieved by transmitting the different signals at different frequencies along the same line. The signals are combined at a particular point in the telecommunications line and split at another point. In particular, at the subscriber side, voice and data signals, which are separate, are combined and sent to the central office via the same line. In the central office the combined signal is split. The voice signal is then directed to the other subscriber(s) on the telephone call, and the data signal is directed to the other subscriber(s) participating in the data exchange. For the transmission of voice and data signals to the subscriber, separate voice and data signals are combined at the central office, sent to the subscriber and split at the subscriber side. After splitting the signal, the so-called POTS-signal (plain old telephone service) can be used to transmit voice signals. The remaining part of the split signal can be used to transmit data, for example. So-called splitters, which are used to split or combine the signal, can generally be arranged at any distribution point.

Any electronic components, which are necessary to perform the above functions, can be contained, possibly together with a printed circuit board as a base, in a functional module, which can be called a splitter module. Similar functional modules are protection modules, which contain any components which provide protection against overvoltage and/or overcurrent, as well as testing and monitoring modules, which contain suitable electronic components and circuits in order to test and/or monitor a telecommunications line. Furthermore, other functional modules in the above sense are known to those skilled in the art.

DE 202 03 912 describes a telecommunications module which can be tilted relative to an edge of a trough-like carrier. The telecommunications module can be provided with a ground contact, which establishes a direct electrical connection with the carrier, also in the tilted position of the telecommunications module. For this purpose, the ground contact can be made resilient.

SUMMARY OF THE INVENTION

The invention provides an assembly of at least one carrier, at least one telecommunications module and at least two grounding elements, a grounding element, a telecommunications module and a carrier for use in the assembly, a kit of parts and a use of at least two grounding elements, by which a reliable connection to ground can be established in an efficient manner.

The assembly includes at least one telecommunications module. The telecommunications module can comprise a housing. The housing can be made of plastic or any other suitable material and can be constituted by one or more components. The housing serves to accommodate telecommunications contacts, to which telecommunications lines are connectable. The housing can also have specific structures for positioning the contacts therein. Moreover, the housing can comprise one or more cavities or receiving spaces, which are adapted to accommodate the contacts and/or objects such as one or more functional modules described above or any other types of outside modules or parts thereof. Finally, the housing can comprise suitable structures, typically at the outside thereof, to enable the telecommunications module to be mounted to a trough, a rack or any other suitable carrier in the field of telecommunications.

Thus, the carrier of the novel assembly, to which at least one grounding element is fittable, can be provided in the form of a trough. This type of carrier can have a substantially U-shaped cross-section and a length, which allows plural telecommunications modules to be directly mounted thereon. Moreover, the telecommunications modules can be displaceable, for example, slideable along the length of the carrier. The carrier can also comprise a substantially L-shaped cross-section, and the telecommunications modules can, firstly, be mounted to one leg of the L-cross-section. Secondly, the telecommunications module can include a second leg which connects the telecommunications module with the other leg of the L-cross-section, which thus acts as a bottom for the resulting assembly. With the described structure of two opposite legs, one, for example, being integral with the other leg, i.e. the bottom of an L-shaped carrier, and the opposite leg being provided on the telecommunications module, the resulting structure is very similar to an assembly in which telecommunications modules are mounted to a trough-like carrier having a bottom and two opposite legs. As regards the above-mentioned design, in which one leg is provided on the telecommunications module, reference is made to the Applicant's European application No. 04 006 530 , which is incorporated herein by reference.

As will be apparent to those skilled in the art, the carrier can comprise suitable structures for mounting telecommunications modules thereon, such as one or more openings, projections, grooves or the like. Moreover, the carrier can include one or more profiled rails, which can, in the case of more than one rail, be arranged parallel to each other to allow the telecommunications modules to be moved along the rails. The one or more rails can have a substantially circular cross-section and/or can be provided with one or more projections, recesses, undercuts or the like, in order to allow secure mounting of telecommunications modules thereon. For this purpose, the telecommunications modules can have, as will be apparent to those skilled in the art, corresponding structures, such as latch hooks, projections or recesses. The carrier will normally at least be partially made of metal, to form part of a connection to ground.

Such a connection can be required for telecommunications modules for a number of reasons. Firstly, telecommunications modules can be provided with overvoltage protectors, such as surge arresters, which serve to divert overvoltage, for example, which might occur in the event of lightning, to ground. Secondly, telecommunications modules and/or wires connected therewith can comprise shielding in order to avoid crosstalk between adjacent lines. Any current, which is induced in any shielding components, needs to be diverted to ground. Moreover, electrostatic charging can occur which can be diverted to ground. Thus, for the above-mentioned purposes an electrical connection between the telecommunications module and ground is beneficial.

In this context, the novel assembly further includes at least two grounding elements, which are fitted to a telecommunications module and/or a carrier as described above. The grounding elements will normally be made of metal or a metalized material, for example, metalized plastic or any other insulating material having surfaces, which are at least partially coated with a conductive material, in order to provide the required electrical connection. In particular, the grounding elements can be only partially coated with a conductive material or can comprise cutouts so as to allow the electrical connection only in certain positions of the grounding elements relative to each other, such as an initial and a pivoted position as described in more detail below. The grounding elements can be provided in a state, in which they are fitted to a telecommunications module and/or a carrier, as will be described in more detail below. However, the grounding elements can also be provided separate from a telecommunications module and/or a carrier so as to add a ground connection to a telecommunications module, which is already mounted to a carrier without a ground connection. Such a retrofitting is, for example, beneficial when new functions are added to an already installed telecommunications module that requires a connection to ground for its new functions. Thus, the grounding elements can be prepared so as to be retrofittable to a telecommunications module and/or a carrier. As an alternative, the telecommunications module and/or the carrier can be provided with the grounding elements, when the telecommunications module is mounted to the carrier for the first time, in order to advantageously provide an assembly having the ground connection from the beginning, i.e. not as an add-on kit. In any case, both the assembly of at least one telecommunications module, at least one carrier and at least two grounding elements as described, and the separate components for use therein are to be considered subject matter of the present application.

Independent from the situation in which the grounding elements are fitted to the telecommunications module and/or the carrier, i.e. before the installation of the telecommunications module or afterwards, the grounding elements can, in the fitted state, be brought into direct contact with each other and can be pivoted with regard to each other while keeping contact. Direct contact means that the two grounding elements of the novel assembly directly contact or abut each other in order to provide an electrical connection. In particular, this electrical connection is also maintained when the grounding elements are pivoted relative to each other. This type of movement can, for example, occur when a telecommunications module, to which a first grounding element is fitted, is pivoted with regard to the carrier, to which a second grounding element is fitted. In other words, for example, the first grounding element can be moved with the telecommunications module and the second grounding element can be fixed and can, together with the carrier, stay in place when the telecommunications module including the first grounding element is pivoted. Such a type of pivoting motion of telecommunications modules relative to a carrier can, for example, be required, in order to get access to a rear side of the telecommunications module. The grounding elements can be designed to keep the contact only during a part of the pivotal movement, which the assembly allows. In other words, the telecommunications module can be pivotable with regard to the carrier for, for example, almost 180°, and the grounding elements can be designed to stay in contact during a range of 0° to, for example, 30°, and, for example, 150° to 180°. In such a situation, the electrical connection is ensured in an initial, closed position, and a pivoted or open position. Naturally, the electrical connection can also be maintained during the full pivotal motion.

At the above-mentioned rear side, functional modules, such as splitter modules, can be inserted. Assuming that the ground connection is established for overvoltage protectors, which are fitted to the telecommunications module, the overvoltage protection, as well as the connection to ground, can be advantageously maintained as the telecommunications module is pivoted. Thus, also when an individual is conducting certain operations at the rear side of the telecommunications module, such as handling functional modules such as splitter modules, both the individual, the telecommunications module and any equipment, which is connected with the lines terminated at the telecommunications module, remain protected. In this context, the contact between the grounding elements does not necessarily have to be maintained during the full pivoting motion. Rather, it can be sufficient if the contact is maintained during a part of the pivoting motion, which the arrangement allows, thus, the electrical contact can be disconnected during parts of the pivoting motion. Moreover, the pivoting motion can be combined with other types of movement such as a translation motion. In particular, such a translation motion can occur in a direction substantially perpendicular to the pivot axis of the pivotal motion. It can also be mentioned that the pivotal motion does necessarily require a physical pivot axis. Rather, this motion can be performed about a virtual axis, which is constituted by a wire, a cable or a bundle of wires or cables, which are connected to the telecommunications module. Whereas this might not necessarily be considered a physical pivot axis, it allows a pivotal motion of the telecommunications module relative to the carrier. Also in such an application, a reliable electrical connection to ground can be obtained by the grounding element described herein and the assembly including these.

In the assembly described herein, the grounding elements do not have to be made of resilient material and do not have to be deformed during their relative pivoting movement, although those options are available. Rather, they can substantially keep their original shape, and the electrical contact during a pivoting motion, can be maintained by sliding contact between the two elements. Furthermore, the permanent electrical connection to ground can be realized by grounding elements, which are fitted to the telecommunications module and/or the carrier in a conventional manner. In other words, the novel assembly eliminates the need for external electrical connections between the telecommunications module and the carrier, such as wires, which connect a grounding element of the telecommunications module with the carrier or a grounding element thereof.

As mentioned briefly above, a first grounding element can be a grounding link which is fittable to the telecommunications module. The assembly described herein can further comprise a grounding bar or a grounding comb which extends along the contacts of the telecommunications module. From plural points of the grounding bar or grounding comb, such as plural projections of a grounding comb, connection with grounding contacts of overvoltage protection modules and/or grounded shield wires of telecommunications wire pairs can be provided. Thus, the grounding link fittable to the telecommunications module can be connectable with such a grounding bar or grounding comb, which can also be fittable to the telecommunications module.

In order to continue the electrical path between the telecommunications module and ground, the assembly described herein can include a second grounding element, which is a ground contact fittable to the carrier. In particular, the ground contact can establish contact with the grounding link on the one hand, and the carrier on the other hand. Moreover, the carrier as such can be connected to ground so that the telecommunications module, in particular a grounding bar or grounding comb thereof, is eventually connected to ground.

As regards the electrical connection between the grounding elements of the assembly described herein, it has been found advantageous to allow for the grounding elements to be brought into sliding contact with each other. In particular, during the pivoting movement of the grounding elements relative to each other, the grounding elements do not have to deform to a considerable extent. Thus, they do not necessarily have to be resilient. Rather, at least one of them can have a portion, such as a bulge, which is adapted to slide along the surface of the other grounding element when relative pivoting motion takes place. This provides a simple structure of the grounding elements and at the same time an efficient electrical connection.

The telecommunications module can be pivotable about a pivot axis, and at least one grounding element can have a portion which is orientated substantially perpendicular to the pivot axis. This implies that the distance between the grounding elements in the direction of the pivot axis is substantially unaffected by the pivoting motion, which allows a sliding contact to be established in a reliable manner in that portion of one of the grounding elements which is substantially perpendicular to the pivot axis. As will be apparent to those skilled in the art, other arrangements which are capable of keeping the contact during the pivoting motion, for example, gradual, resilient deformation of a biased grounding element, are also possible. Corresponding to the pivotability of the telecommunications module relative to the carrier, the telecommunications module can be mountable to the carrier in a pivotable manner. Thus, also in a pivoted position of the telecommunications module, the grounding elements keep the connection to ground, so that the telecommunications module and any individual handling of the telecommunications module and/or functional modules are protected.

In order to allow for a relatively easy access to the rear side of a telecommunications module, while keeping a ground connection, it is advantageous for the telecommunications module to be pivotable with regard to the carrier by more than 90°. Even better access will be provided, when this angle of pivoting motion is more than 120° or even more than 150°.

Moreover, the portion oriented substantially perpendicular to the pivot axis can have a centered portion, which is centered around the pivot axis. Thus, a defined area for establishing the electrical contact can be provided in the vicinity of the pivot axis. This advantageously keeps the required space for the grounding elements relatively small.

In particular, tests have led to very good results with a centered portion which has a partially circular portion, for example, the centered portion can have a circular contour at an inner edge thereof so as to surround a pivot axis. Moreover, an outer contour can be circular and can, possibly in combination with a circular inner contour, delimit a portion, along which a part of another grounding element moves when the grounding elements are pivoted relative to each other. Thus, the center portion can have the shape of an open ring, a shape which is similar to a "C", a sickle or crescent-shape. An inverted "C"-shape of an open ring is shown in the drawings.

Moreover, good experimental results were achieved with an embodiment in which the portion oriented substantially perpendicular to the pivot axis has at least one bulge. As mentioned briefly above, the bulge provided on one grounding element can be adapted to move along a surface of the other grounding element, when pivoting motion takes place, in order to maintain a reliable electrical connection also during such a movement. As will be apparent, the bulge can also be formed as any other type of protrusion.

It also provides advantages if at least one grounding element has bends about nonparallel axes. For example, the above-mentioned portion, which is substantially perpendicular to a pivot axis, can be bent from one grounding element. Moreover, the grounding element can comprise one or more further bends, which are at an angle to the first bend. This leads to a structure of the grounding element which is particularly advantageous for contacting further components, such as a grounding rail or comb provided on the telecommunications module. When a grounding element having the above-described bends is fitted to a carrier these bends can be designed to provide a reliable electrical contact with the carrier.

In accordance with the additional benefits mentioned above, the assembly described herein can further include at least one grounding rail, which is fittable to the telecommunications module and connectable with a first ground element.

In this context, the grounding rail, which can then also be considered a grounding comb, can have plural projections, each of which is connectable with an overvoltage protection module. The overvoltage protection module can be fittable to the telecommunications module and can have a ground contact in order to divert overvoltage to ground. This can reliably be performed by the mentioned grounding rail and the further grounding elements of the assembly described herein.

This advantage particularly shows, when the assembly described herein further includes at least one overvoltage protection module.

Moreover, additional functions can be performed by the novel assembly, when this includes at least one splitter module. In this embodiment, the novel assembly is adapted to be used in ADSL-services.

The advantages of the assembly described herein are particularly evident when the splitter module is fittable, for example, insertable into the telecommunications module from a rear side when telecommunications lines are connectable at a front side. Thus, in order to handle the splitter modules, the telecommunications module needs to be pivoted and the novel assembly of grounding elements keeps the ground connection also in the pivoted position.

As reflected in the further claims, the invention also provides a grounding element, a telecommunications module and a carrier for use in the above-described assembly. Further, a grounding element, a telecommunications module and a carrier which are suited for being used in the above-described assembly, as described in detail in further claims, are provided by the invention. The carrier and the telecommunications module can have at least one grounding element fitted thereto. Finally, a kit of parts described in a further claim is adapted to form the novel assembly therefrom, and the invention also provides a use of at least two grounding elements, as described in the last claim, which can be brought into direct contact with each other and can be pivoted with regard to each other while keeping the contact, leading to the advantages described above.

BRIEF DESCRIPTION OF THE DRAWINGS

Hereinafter the invention will be described by a non-limiting example thereof with reference to the drawings, in which.

DETAILED DESCRIPTION THE INVENTION

Figure 1:
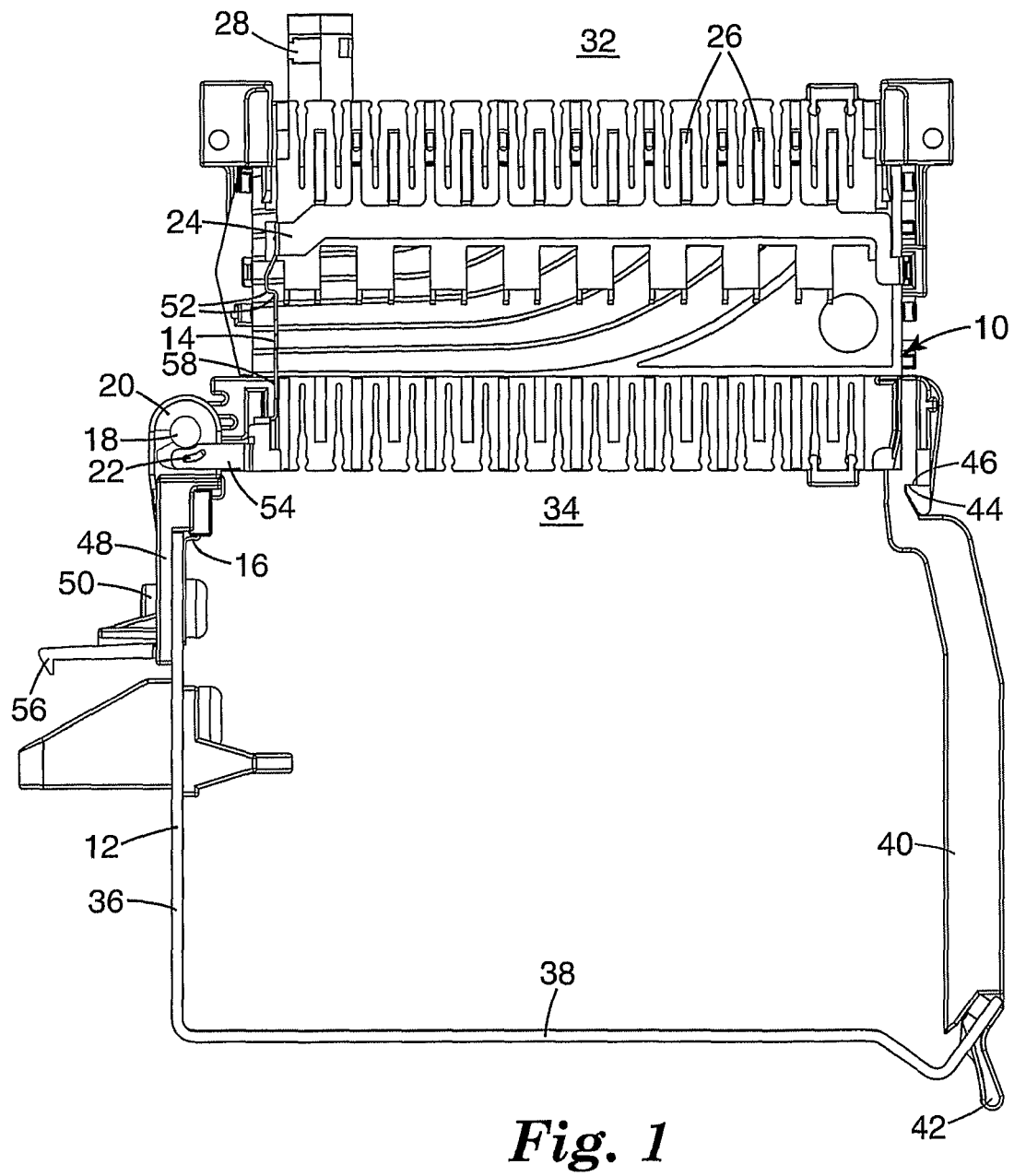
FIG. 1 shows a side view of an assembly of a telecommunications module, a carrier and two grounding elements in a first position.

FIG. 1 shows an assembly of a telecommunications module 10, which is mounted to a carrier 12. The telecommunications module 10 has, at a front side 32 thereof, one or more rows of contacts, of which details are not shown in FIG. 1, in order to allow the connection of telecommunications lines therewith. As will be apparent to those skilled in the art, in the orientation shown, the rows of contacts extend from left to right. Moreover, additional rows of contacts can be present "behind" the plane of the drawing of FIG. 1. Normally, the dimension of the telecommunications module 10 in a direction perpendicular to the plane of the drawing in FIG. I is remarkably smaller than that from left to right, as it can be seen in FIG. 1. Therefore, when viewed from the front side 32, the telecommunications module 10 has a strip-like appearance.

At a rear side 34, the telecommunications module 10 is mounted to a carrier 12. In the embodiment shown, the carrier 12 has a substantially L-shaped cross-section with a leg 36 and a bottom 38. The carrier has, in the embodiment shown, an extension perpendicular to the plane of the drawing of FIG. 1, so that plural telecommunications modules 10 can be mounted thereto.

In the case shown, the telecommunications module 10 comprises an extension 40 opposite the leg 38 of the carrier 12, which comprises, in the embodiment shown, a latch hook 42, which can be inserted into an opening (not shown) in the V-shaped free end of the bottom 38. In the embodiment shown, the extension 40 is attached to the telecommunications module 10 by the interaction of a projection 44 provided on the telecommunications module 10, in particular a housing part thereof, and an undercut 46 provided on the extension 40. When the latch hook 42 is released from the bottom 38 of the carrier, the telecommunications module 10 including the extension 40 can be pivoted about pivot axis 18. In the embodiment shown, pivot axis 18 is provided on a pivot adapter 48, which is attached to the leg 38 of the carrier 12, in the embodiment shown, by a screw 50. With the described design, in particular with extension 40 attached to the telecommunications module 10 and being pivotable therewith, the telecommunications module 10 can be brought into a pivoted position, in which, for example, splitter modules can be inserted into the telecommunications module 10 from a rear side thereof. As the splitter modules (not shown) can extend close to the bottom 38 of the carrier, the telecommunications module 10 can, also with splitter modules fitted thereto, be pivoted back into the position shown in FIG. 1.

In the embodiment shown, the pivot axis 18 is provided on the pivot adapter 48. Thus, the telecommunications module 10 has a structure complementary to the pivot axis 18, such as a bore and/or an eyelet, in order to allow the desired pivoting motion of the telecommunications module 10 relative to the carrier 12. In FIG. 1, an overvoltage protection module 28 is shown, which has a grounding contact (not shown), in order to divert overvoltage to ground. This is realized, firstly, by a grounding rail 24, which extends along the side of the telecommunications module 10 and comprises, in the embodiment shown, plural projections 28 for contacting the grounding contacts of plural overvoltage protection modules. Due to the plural projections 28, the grounding rail 24 can also be called a grounding comb. The grounding rail 24 can, for example, be stamped from sheet metal, and its sheet-metal plane can, as shown in FIG. 1, be parallel to the side of the telecommunications module 10, i.e., parallel to the plane of the drawing of FIG. 1.

The grounding rail 24 is electrically connected with a grounding link 14, which is also fitted to the telecommunications module. In the case shown, the sheet-metal plane of the grounding link 14 is, at least in the vicinity of grounding rail 24, substantially perpendicular to the plane of the drawing. In the case shown, plural bends 52 are present, in order to achieve the desired shape of the grounding link 14. The above-mentioned bends 52 have, in the embodiment shown, a bending axis which is substantially perpendicular to the plane of the drawing of FIG. 1. In a rear part of the grounding link 14, a bend 58 is provided, of which the bending axis is at an angle of substantially 90° to the bending axis of the above-mentioned bends 52. This results in a portion of the grounding link 14, of which the sheet-metal plane is substantially parallel to the plane of the drawing of FIG. 1. This portion comprises, in the embodiment shown, a tab 54 with a bulge 22. This bulge 22 extends away from the viewer of FIG. 1 and towards a centered portion 20 of the second grounding element 16 of the novel assembly, which is a ground contact fittable to the carrier 12. The centered portion 20 has, in the orientation of FIG. 1, the appearance of an inverted "C" and extends, in the shape of an open ring, around pivot axis 18.

Similar to the portion of grounding link 14, which comprises the tab 54, the centered portion 20 has a sheet-metal plane which is substantially parallel to the plane of the drawing of FIG. 1. By a combination of bends which, in the vicinity of the centered portion 20, have a bending axis parallel to the plane of the drawing of FIG. 1, and further rearwards, have bending axes substantially perpendicular to the plane of the drawing, the centered portion 20 is integrally linked with a rear part of the ground contact 16, of which the sheet-metal plane is substantially perpendicular to the plane of the drawing of FIG. 1. In the case shown, the centered portion 20 is somewhat offset relative to the leg 38 of the carrier 12, and the rear part of the ground contact 16 extends from this offset position to the leg 38. The ground contact 16 is held by the screw 50 in a position, in which it abuts the leg 36.

In summary, an electrical connection between the ground contact of the overvoltage protection module 28 and ground is established via the grounding rail 24, the grounding link 14, the ground contact 16 and the carrier 12, which is itself connected to ground. In the embodiment shown, the bulge 22 is somewhat arc-shaped and moves, as can be seen from a comparison of FIG. 1 and 2, when the telecommunications module 10 is pivoted (in the orientation shown counterclockwise) along the centered portion 20 while maintaining a sliding contact. Still referring to FIG. 1, the pivot adapter 48 comprises a projection with a latch hook 56, which serves to lock the telecommunications module 10 in the pivoted position.

Figure 2:
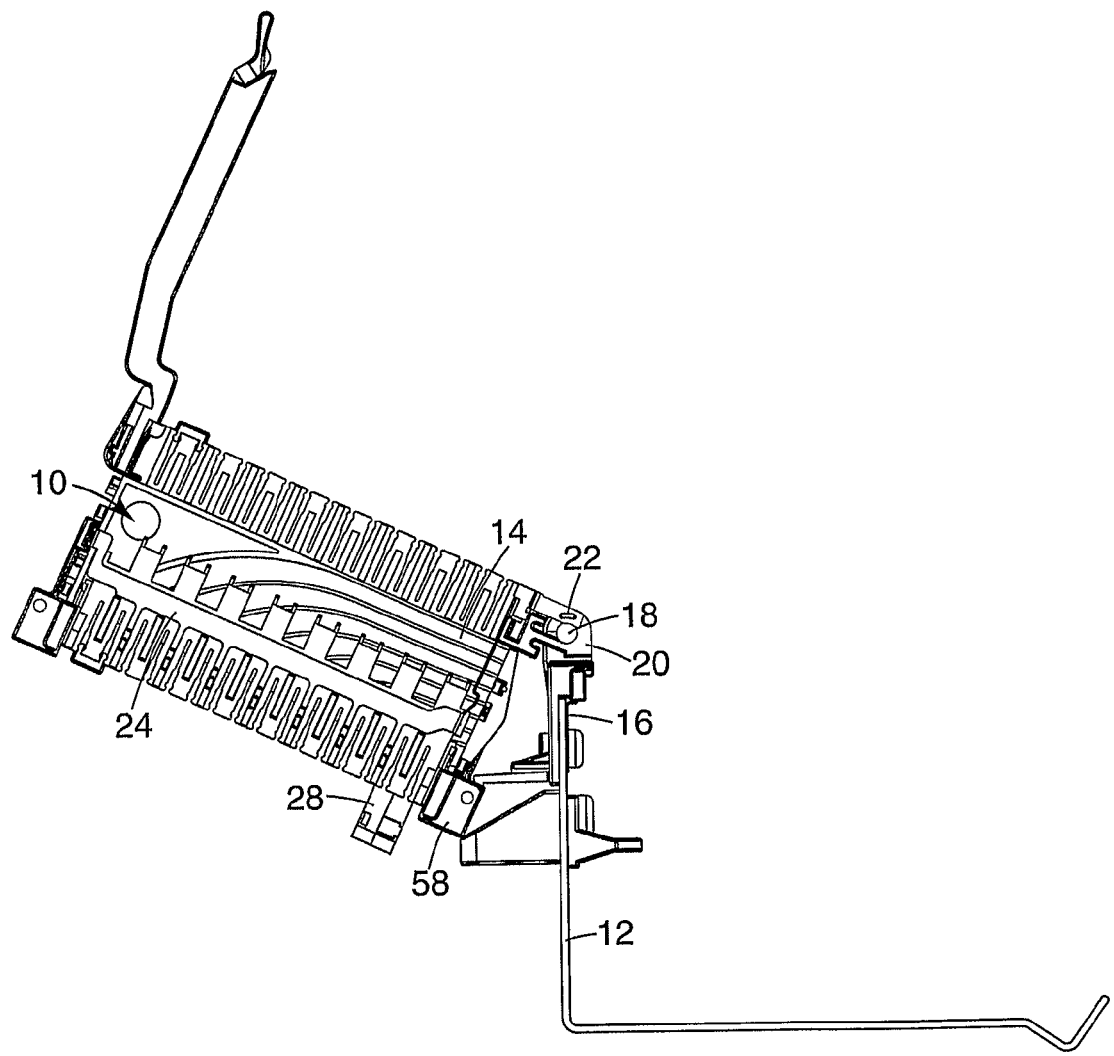
FIG. 2 shows the assembly of FIG. 1 in a second, pivoted position.

This position is shown in FIG. 2. As compared to FIG. 1, the telecommunications module 10 has been pivoted counterclockwise for approximately 155°, in the case shown, so as to engage the latch hook 56 (not visible in FIG. 2) with a complementary structure 60 provided on the telecommunications module 10. As shown in FIG. 1, the rear side 34 of the telecommunications module 10 is advantageously accessible in the pivoted position which, for example, allows splitter modules (not shown) or other functional modules to be inserted from that side. It is also shown in FIG. 2 that, due to the pivoting movement of the telecommunications module 10, the bulge 22 of grounding link 14 has traveled along the centered portion 20 and is still in contact with the latter. Thus, the connection to ground is also established in the pivoted position of the telecommunications module 10 shown in FIG. 2.

The present invention has now been described with reference to an embodiment thereof. The foregoing detailed description and embodiment have been given for clarity of understanding only. No unnecessary limitations are to be understood there from. For example, all references to front, rear, sides, axes, planes, and directions are exemplary only and do not limit the claimed invention. It will be apparent to those skilled in the art that many changes can be made to the embodiment described without departing from the scope of the invention. Thus, the scope of the present invention should not be limited to the exact details and structures described herein, but rather by the structures described by the language of the claims, and the equivalents of those structures.

The invention claimed is:

1. An assembly of at least one carrier, at least one telecommunications module mounted on the carrier and at least two grounding elements, at least one grounding element being fitted to the telecommunications module, and at least one grounding element being fitted to the carrier, wherein the grounding elements are in direct contact with each other and can be pivoted with regard to each other while keeping the contact, wherein the telecommunications module is pivotable about a pivot axis, and at least one grounding element has a portion which is oriented substantially perpendicular to the pivot axis, and wherein the portion oriented substantially perpendicular to the pivot axis has at least one bulge.

2. The assembly in accordance with claim 1, wherein a first grounding element is a grounding link fitted to the telecommunications module.

3. The assembly in accordance with claim 1, wherein a second grounding element is a ground contact fitted to the carrier.

4. The assembly in accordance with claim 1, wherein the grounding elements are in a sliding contact with each other.

5. The assembly in accordance with claim 1, wherein the telecommunications module is pivotable with regard to the carrier by more than 90 degrees, preferably more than 120 degrees and more preferably for more than 150 degrees.

6. The assembly in accordance with claim 1, wherein the portion oriented substantially perpendicular to the pivot axis has a centered portion, which is centered around the pivot axis.

7. The assembly in accordance with claim 6, wherein the centered portion has a partially circular portion.

8. The assembly in accordance with claim 1, wherein at least one grounding element has bends about nonparallel axes.

9. The assembly in accordance with claim 1 further having at least one grounding rail fitted to the telecommunications module and connected with a first grounding element.

10. The assembly in accordance with claim 9, wherein the grounding rail has plural projections, each of which is connectable with an over-voltage protection module.

11. The assembly in accordance with claim 1 further having at least one over-voltage protection module.

12. The assembly in accordance with claim 1 further having at least one splitter module.

13. The assembly in accordance with claim 12, wherein telecommunication lines are connectable at a front side, and the splitter module is insertable from a rear side.

14. A grounding element for use in an assembly in accordance with claim 1.

15. A telecommunications module for use in an assembly in accordance with claim 1.

16. A carrier for use in an assembly in accordance with claim 1.

* * * * *